US008289133B2

(12) United States Patent
Tseng

(10) Patent No.: US 8,289,133 B2
(45) Date of Patent: Oct. 16, 2012

(54) MOBILE-CONTROLLED ELECTRIC ENTRANCE DEVICE

(75) Inventor: Wei Fen Tseng, Daxi Township, Taoyuan County (TW)

(73) Assignee: Waveshielding Co., Ltd., Zhongli (TW)

( * ) Notice: Subject to any disclaimer, the term of this patent is extended or adjusted under 35 U.S.C. 154(b) by 394 days.

(21) Appl. No.: 12/580,334

(22) Filed: Oct. 16, 2009

(65) Prior Publication Data

US 2011/0090043 A1 Apr. 21, 2011

(51) Int. Cl.
*B60R 25/00* (2006.01)
*H04M 1/00* (2006.01)

(52) U.S. Cl. ............ 340/5.7; 340/5.2; 340/5.6; 340/5.8; 455/556.1

(58) Field of Classification Search .................. 340/3.3, 340/3.31, 3.32, 5.1, 5.2, 5.22, 5.23, 5.6, 5.61, 340/5.63, 5.64, 5.65, 5.7, 5.8, 5.81, 5.85, 340/12.19, 12.22, 12.24, 12.3; 455/417–419
See application file for complete search history.

(56) References Cited

U.S. PATENT DOCUMENTS 4,438,430 A * 3/1984 Young et al. .................. 340/547
7,953,402 B2 * 5/2011 Carolan et al. ................ 455/419

* cited by examiner

*Primary Examiner* — Daniel Wu
*Assistant Examiner* — Mancil Littlejohn

(57) ABSTRACT

A mobile-controlled electric entrance device includes an electrically powered entrance body and a control unit. The control unit includes a mobile phone number comparison unit, a storage unit, an oscillation timer, a delay and sequential logical decoding unit, a current driver and a relay switch. The mobile phone number comparison unit receives a call from the mobile phone with a phone number and demodulates the number to be compared with a plurality of predetermined phone numbers. If the phone number is not found in the predetermined phone numbers, the mobile phone number comparison unit is back to a stand-by state. If the phone number is found in the predetermined phone numbers, the mobile phone number comparison unit transmits a signal to trigger the oscillation timer to generate a sequential pulse for opening or closing the electrically powered entrance body.

16 Claims, 9 Drawing Sheets

MOBILE-CONTROLLED ELECTRIC ENTRANCE DEVICE

BACKGROUND OF THE INVENTION

1. Field of the Invention

The present invention relates to an entrance device and, more particularly, to a mobile-controlled electric entrance device for opening or closing the electrically powered body according to how long the ringing time lasts (not the number of ring pluses).

2. Description of Related Art

Nowadays, a phone-controlled electric door connects to a phone. After connecting, a password is inputted into the phone, and the electric door can be opened after comparing and certifying the password. It costs a sufficient communication fee to open the electric door each time. It accumulates a big expense over a long period of time. Besides, it is not only the cost of the communication fee, but it also occupies the public channel that results in the waste of public goods. Furthermore, the conventional security controlled method uses a password with four digits. It is easy for some people to decode and may result in insecurity.

A conventional one-touch electric door utilizing a controlling method is shown in FIG. 6. The controlling method of the conventional one-touch electric door is by pressing one time to open the electric door and by pressing again to close the electric door. Moreover, a conventional two-button electric door utilizing a controlling method is shown in FIG. 7. The conventional two-button electric door includes two buttons. One button is for opening the electric door, and the other button is for closing the electric door. Besides, a conventional two-button electric door with an awakening function utilizing a controlling method is shown in FIG. 8. The conventional two-button electric door with an awakening function also includes two buttons. A first button is for opening the electric door, and a second button is for closing the electric door. The controlling method of the conventional two-button electric entrance device with an awakening function is by pressing the first button one time for opening the electric door, it only awakens the circuit. Then, the user has to press the first button again to open the electric door. It is designed to avoid mistakenly touching the first button or the second button. Similarly, when pressing the second button one time for closing the electric door, it only awakens the circuit. Then, the user has to press the second button again to close the electric door. Several reasons cause different periods of time to display the incoming calls such as different internet frameworks (CSM, CDMA, PHS and the like), different types of mobile phones, distance, and so on. These factors often result in mistaken operation of the electric door. Practically, a conventional phone-controlled method does not confirm whether the electric door is opened or closed. Therefore, safety is still a grave concern in the conventional electric door. Thus, the need for improvement still exists.

SUMMARY OF THE INVENTION

The main objective of the present invention is to provide an improved mobile-controlled electric entrance device. The mobile-controlled electric entrance device comprises an electrically powered entrance body and a control unit. The control unit includes a mobile phone number comparison unit, a storage unit, an oscillation timer, a delay and sequential logical decoding unit, a current driver, and a relay switch. The control unit is adapted to be controlled by a mobile phone wirelessly. The storage unit stores a plurality of predetermined phone numbers. The mobile phone number comparison unit receives a call from the mobile phone and demodulates the same to compare a phone number of the call with the predetermined phone numbers to generate a comparison result. An output operation is blocked by the delay and sequential logical decoding unit to prevent an error operation. The oscillation timer is electrically connected to the delay and sequential logical decoding unit to provide a necessary internal timing. If the phone number is not found in the predetermined phone numbers based on the comparison result, the mobile phone number comparison unit returns to a stand-by state. If the phone number is found in the predetermined phone numbers based on the comparison result, the mobile phone number comparison unit transmits a signal to trigger the oscillation timer to generate a sequential pulse. The delay and sequential logical decoding unit is controlled to operate the current driver and the relay switch according to the sequential pulse for opening or closing the electrically powered entrance body.

By utilizing the invention, the following advantages are obtained. First, the present invention is able to compare and confirm the 8-11 digit phone numbers as the password before the mobile phone is connected (pick-up). The present invention can reset the output to prevent error operation when comparing the phone number. Therefore, according to the present invention, the operation does not cost excessive communication fee, and, thus, it is more economical. Thus, the present invention can effectively use the public goods and guarantee safety.

Second, in the present invention, the oscillation timer further generates a sequential pulse itself. The delay and sequential logical decoding unit decides to open or close the electrically powered entrance body according to a ringing time (not the number of ring pulses) of a mobile controller. For example, a first short call can open the electrically powered entrance body, and a next second short call can close the electrically powered entrance body, or a first short call can open the electrically powered entrance body, and a next second long call can close the electrically powered entrance body. Thus, there are no complex instructions in the present invention. The present invention can save a lot of communication expense and can be adapted to many common locks or electric doors.

Further benefits and advantages of the present invention will become apparent after a careful reading of the detailed description with appropriate reference to the accompanying drawings.

DETAILED DESCRIPTION OF THE INVENTION

Figure 1:
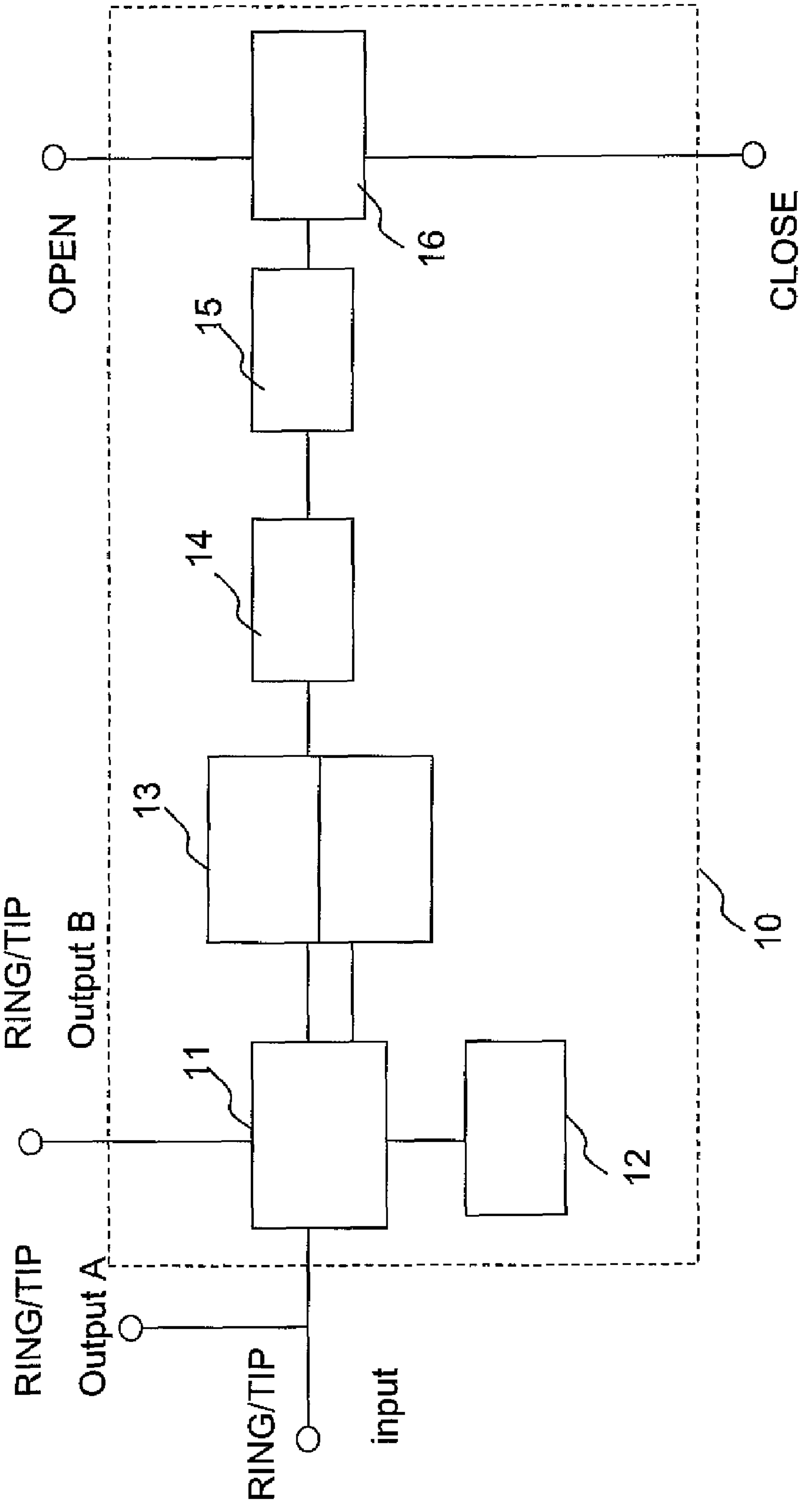
FIG. 1 is a schematic diagram of a mobile-controlled electric entrance device in accordance with the present invention.

Referring to FIGS. 1-5, a mobile-controlled electric entrance device includes an electrically powered entrance body and a control unit 10. The control unit 10 includes a mobile phone number comparison unit 11, a storage unit 12, an oscillation timer 13, a delay and sequential logical decoding unit 14, a current driver 15 and a relay switch 16. The control unit 10 is adapted to be controlled by a mobile phone wirelessly. The storage unit 12 stores a plurality of predetermined phone numbers. The mobile phone number comparison unit 11 receives a call from the mobile phone with a phone number and demodulates to be compared with the predetermined phone numbers. The oscillation timer 13 is electrically connected to the delay and sequential logical decoding unit 14, the current driver 15 and the relay switch 16 in sequence. If the phone number cannot be found in the predetermined phone numbers, the mobile phone number comparison unit 11 is back to a stand-by state. If the phone number can be found in the predetermined phone numbers, the mobile phone number comparison unit 11 transmits a signal to trigger the oscillation timer 13 to generate a sequential pulse. The delay and sequential logical decoding unit 14 is controlled to operate the current driver 15 and the relay switch 16 according to the sequential pulse for opening or closing the electrically powered entrance body. The storage unit 12 can save the user's relatives' or his/her residential phone numbers.

Preferably, the control unit 10 is further in parallel connection with a communication device 20. The communication device 20 can be a telephone, a facsimile or a modem. The communication device 20 can be used for displaying the number of an incoming call or adding other functions.

Preferably, the control unit 10 is further electrically connected to a door-opened feedback unit 30. Thus, a user can check and confirm if the electrically powered entrance body is opened or closed at any time to guarantee the safety effectively.

Preferably, the door-opened feedback unit 30 is a reed switch alarm.

Preferably, the control unit 10 is further electrically connected to an alarm termination unit 40. The alarm termination unit 40 is connected to a security unit. When the electrically powered entrance body is opened, the alarm termination unit 40 can turn off the alarm from the security unit at the same time.

Preferably, the control unit 10 is further electrically connected to a mobile calling unit 50 for getting a car. Therefore, the user can wirelessly call his/her car to be positioned. It can effectively help a user to find his or her car earlier and more conveniently.

Preferably, the electrically powered entrance body is a cathode lock-style door, an anode lock-style door, an electronic lock-style door, a roller door, a roller window, a fence-style door in a driveway, an entrance of a parking tower and so on.

Preferably, the delay and sequential logical decoding unit 14 is a logical circuit. The delay and sequential logical decoding unit 14 provides logical function to delay, control and output according to different sequential signals transmitted from the oscillation timer 13 to meet the needs of various roller doors.

Preferably, the oscillation timer 13 further generates a sequential pulse. The delay and sequential logical decoding unit 14 decides to open or close the electrically powered entrance body according to a ringing time of a mobile controller. The mobile controller is the mobile phone.

Preferably, the current driver 15 is a circuit including transistors. Because utilizing TTL or CMOS cannot directly drive a relay, the circuit including transistors is designed for switching the relay on. Besides, the relay switch 16 is the interface between the electrically powered entrance body and the control unit 10.

Moreover, by utilizing pulses and transmitting signals in the present invention, a first short call can open the electrically powered entrance body, and a next second short call can close the electrically powered entrance body, or a first short call can open the electrically powered entrance body, and a next second long call can awaken and close the electrically powered entrance body.

Referring to FIG. 1, after receiving an incoming call signal, the control unit 10 demodulates the signal and compares it with the predetermined phone numbers. If the phone number cannot be found in the predetermined phone numbers, the mobile phone number comparison unit is back to a stand-by state. If the phone number can be found in the predetermined phone numbers, the mobile phone number comparison unit transmits a signal to trigger the oscillation timer to generate an RC product-related sequential pulse. The RC period can be adjusted. The delay and sequential logical decoding unit 14 is controlled to operate the current driver 15 and the relay switch 16 according to the sequential pulse for opening or closing the electrically powered entrance body. The predetermined phone numbers can be added or deleted according to the user's need. The storage unit 12 can be an EEPROM unit. Counting the ringing time can be replaced by counting ringing times or times of playing music, but counting ringing times or times of playing music may result in calculating difficulties.

There are several characteristics in the present invention. First, while the mobile-controlled electric entrance device is switched on or off and at this time, its circuit transmits a "reset" or "clean" signal to prevent interfering that may cause a mistaken operation.

Second, when the mobile phone number comparison unit 11 is operated, the incoming signal can be filtered from the predetermined phone numbers in a disconnected state (free of charge). If the comparison result indicates that the phone number is one of the predetermined phone numbers, the mobile phone number comparison unit 11 transmits a pulse to trigger the oscillation timer 13. Then, the oscillation timer 13 can transmit a pulse having different time widths. Two pulses having different time widths can be compared and logically outputted to switch on the relay via the current driver 15.

Third, according to different styles of electric doors, the present invention differentiates the output state in accordance with the period of the ringing time. The present invention can be adapted to have various kinds of push buttons and can generate a sequential signal (not according to the ringing times of a telephone and telegraph office) to determine to close or open the door according to how long the ringing lasts.

Figure 2A:
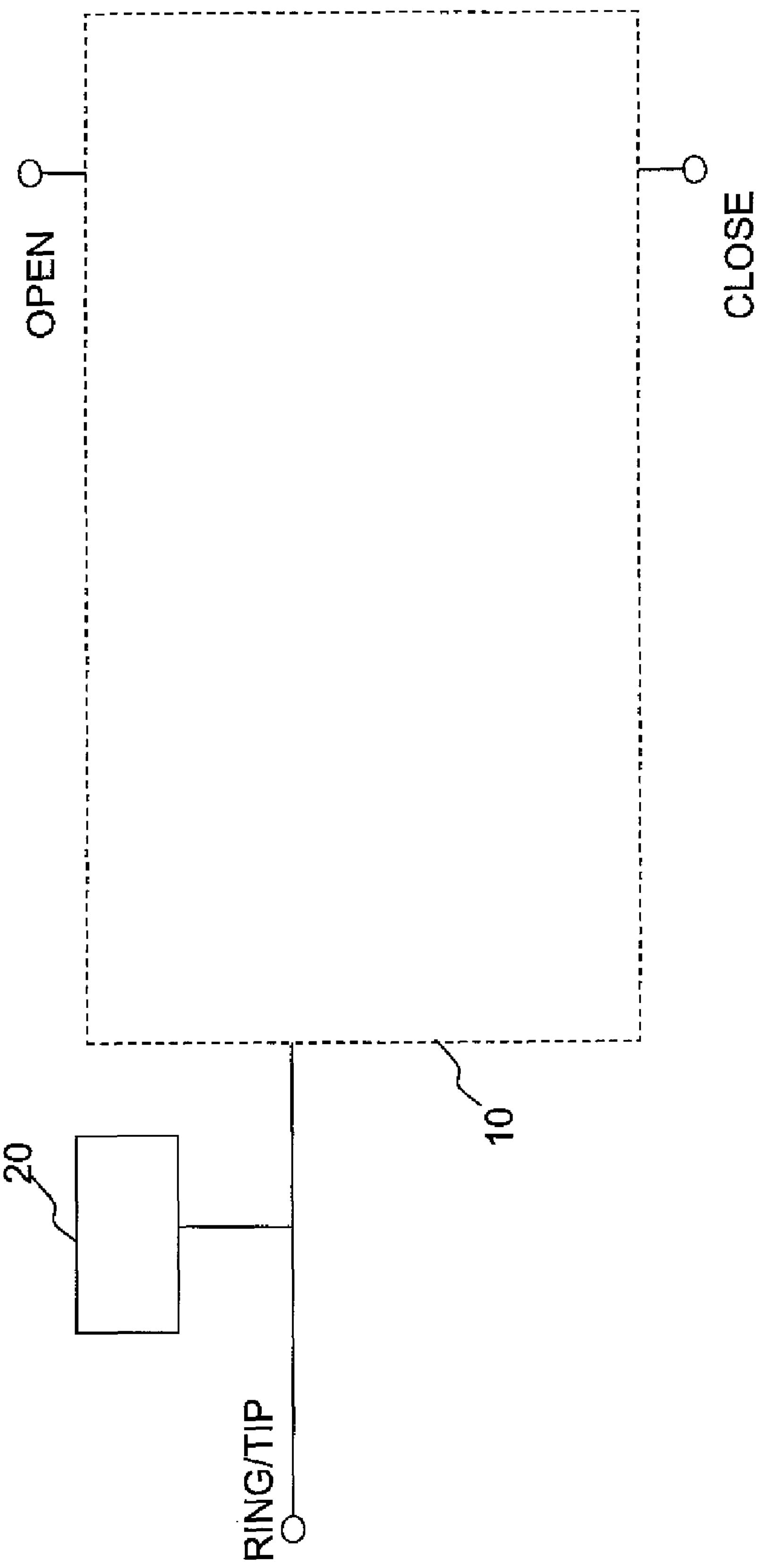
FIG. 2A is another schematic diagram of the mobile-controlled electric entrance device in accordance with the present invention.
Figure 2B:
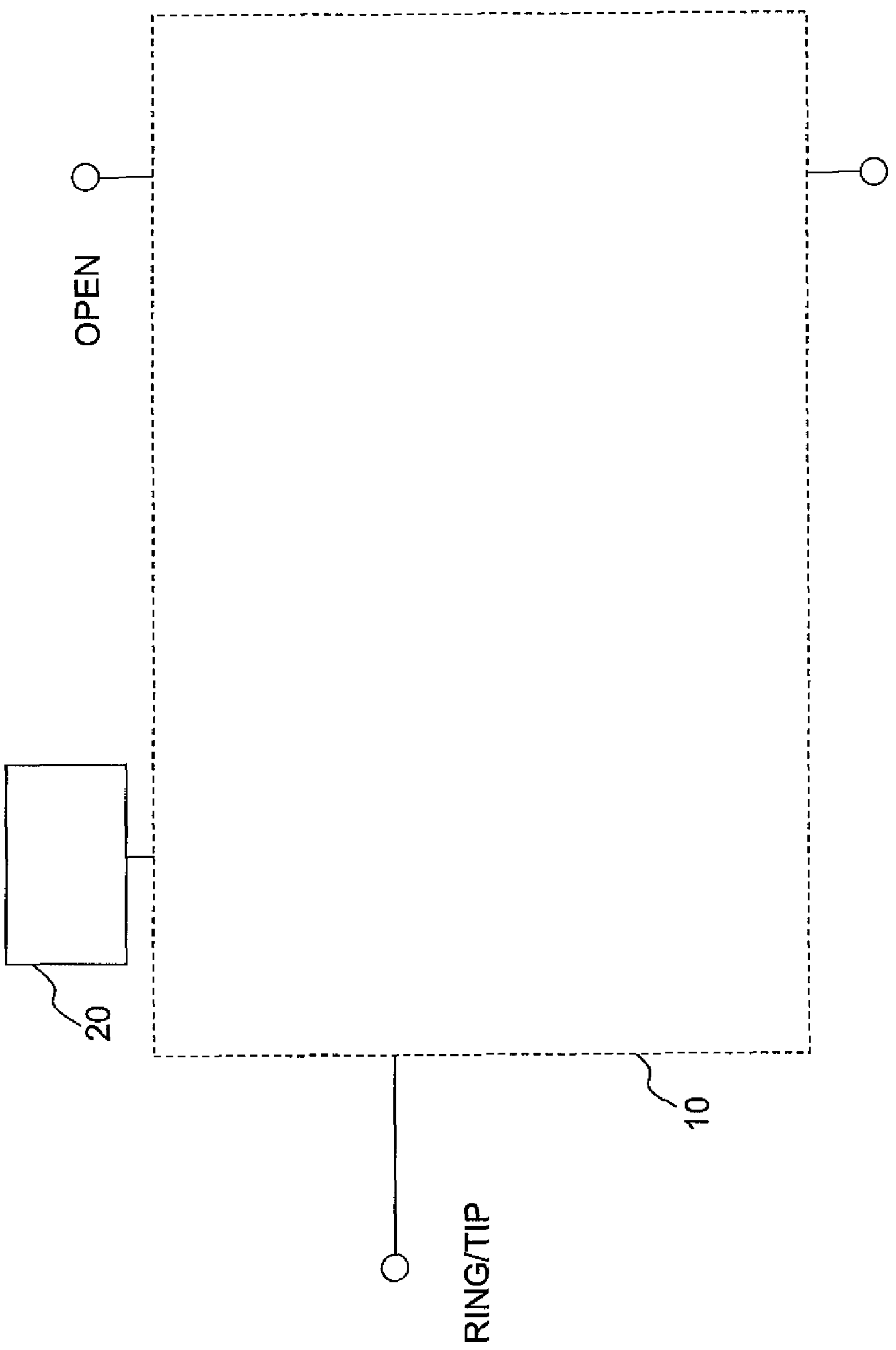
FIG. 2B is another schematic diagram showing the mobile-controlled electric entrance device in accordance with the present invention.

FIGS. 2A and 2B are schematic diagrams to show the wiring method in the present invention. The input unit is a telephone line of a telephone and telegraph office. FIG. 2A can be adapted to being in parallel connection with a telephone. Without respect to signals for opening or closing (may also unlock or lock) the door or simply an incoming phone call, the telephone call will trigger the bell to ring. As shown in FIG. 2B, it shows how to adapt to be in parallel connection with the telephone via a control box to enable the telephone to ring when the signal is just an incoming phone call. Moreover, when the signals are signals for opening or closing the door, its output can be directly connected to the electrically powered entrance body or door switch. Thus, a user will not mistakenly answer the telephone.

The present invention can include two circuit boards. One of the two circuit boards is adapted to have a logical processing function and includes a one shot IC and a logical determination IC. The other of the two circuit boards is adapted to recognize the phone numbers, switch on the relay, etc.

Figure 3:
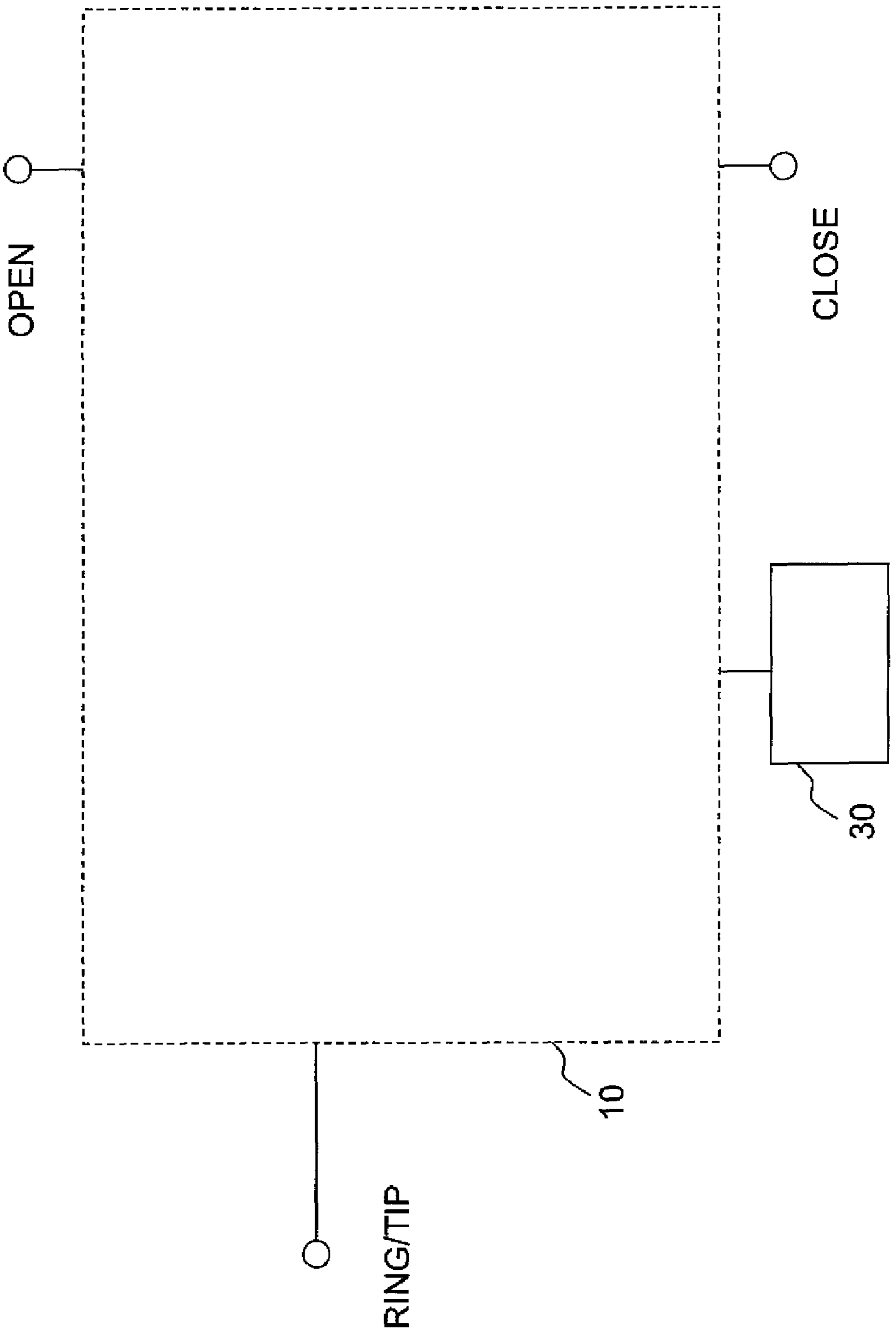
FIG. 3 is another schematic diagram showing a door-opened feedback unit of the mobile-controlled electric entrance device in accordance with the present invention.

Besides, when the operator is at a distant place, a series connection can be applied with a reed switch alarm for ensuring the operation of opening and closing the door normally (as shown in FIG. 3). When the electrically powered entrance body is in the opening state or closing state for a long period of time, the state information can be transmitted to a predetermined phone number. Therefore, the state of the electrically powered entrance body can be confirmed at any time and at any place to guarantee safety.

Figure 4:
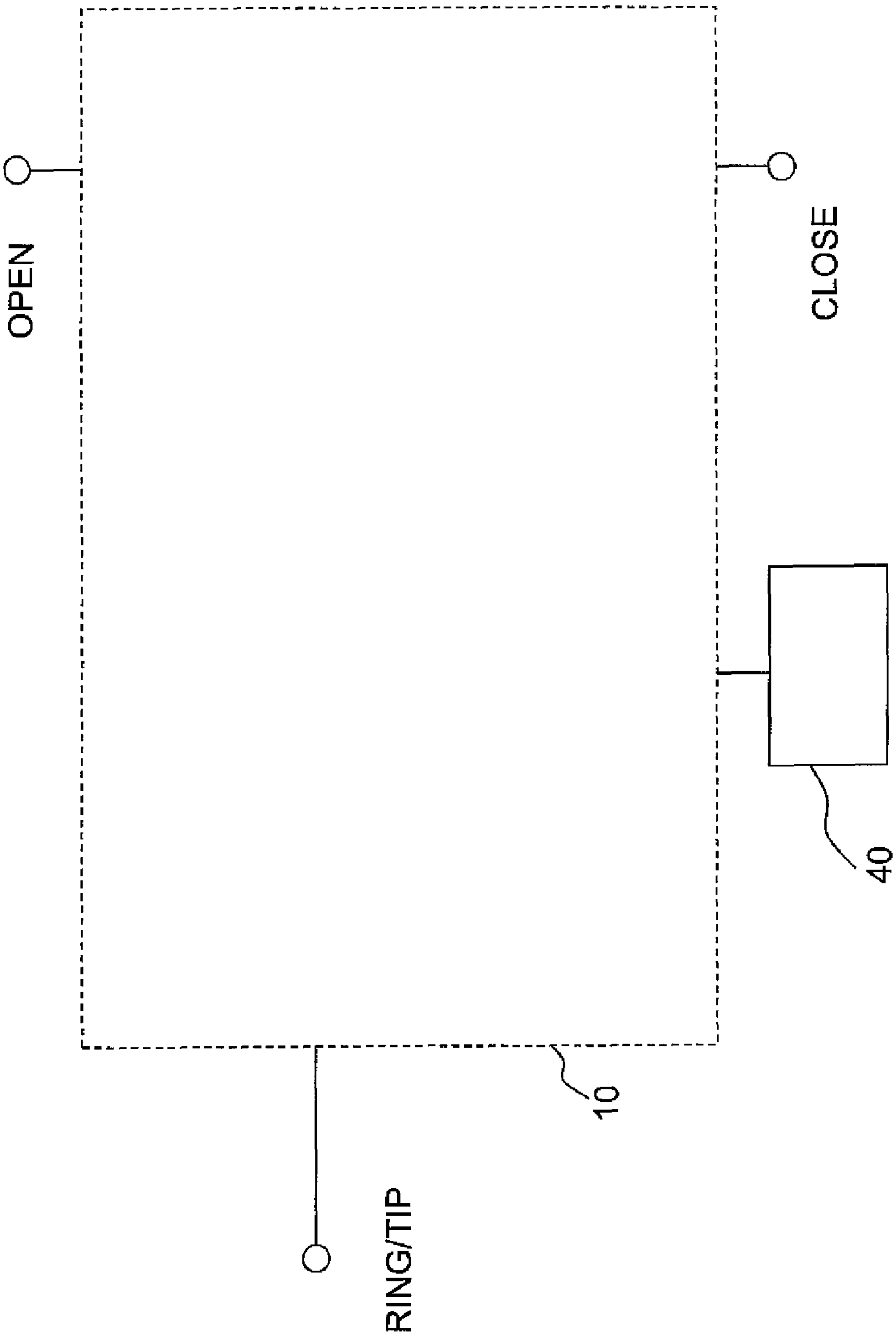
FIG. 4 is another schematic diagram showing an alarm termination unit of the mobile-controlled electric entrance device in accordance with the present invention.

Furthermore, as shown in FIG. 4, when the operator is at a distant place and there is a security system mounted at home and in order that the alarm can be disconnected and to ensure the electrically powered entrance body can operate normally, the opening or closing state design can be adapted to be in parallel connection with the junction for disconnecting the alarm to guarantee safety and convenience.

Figure 5:
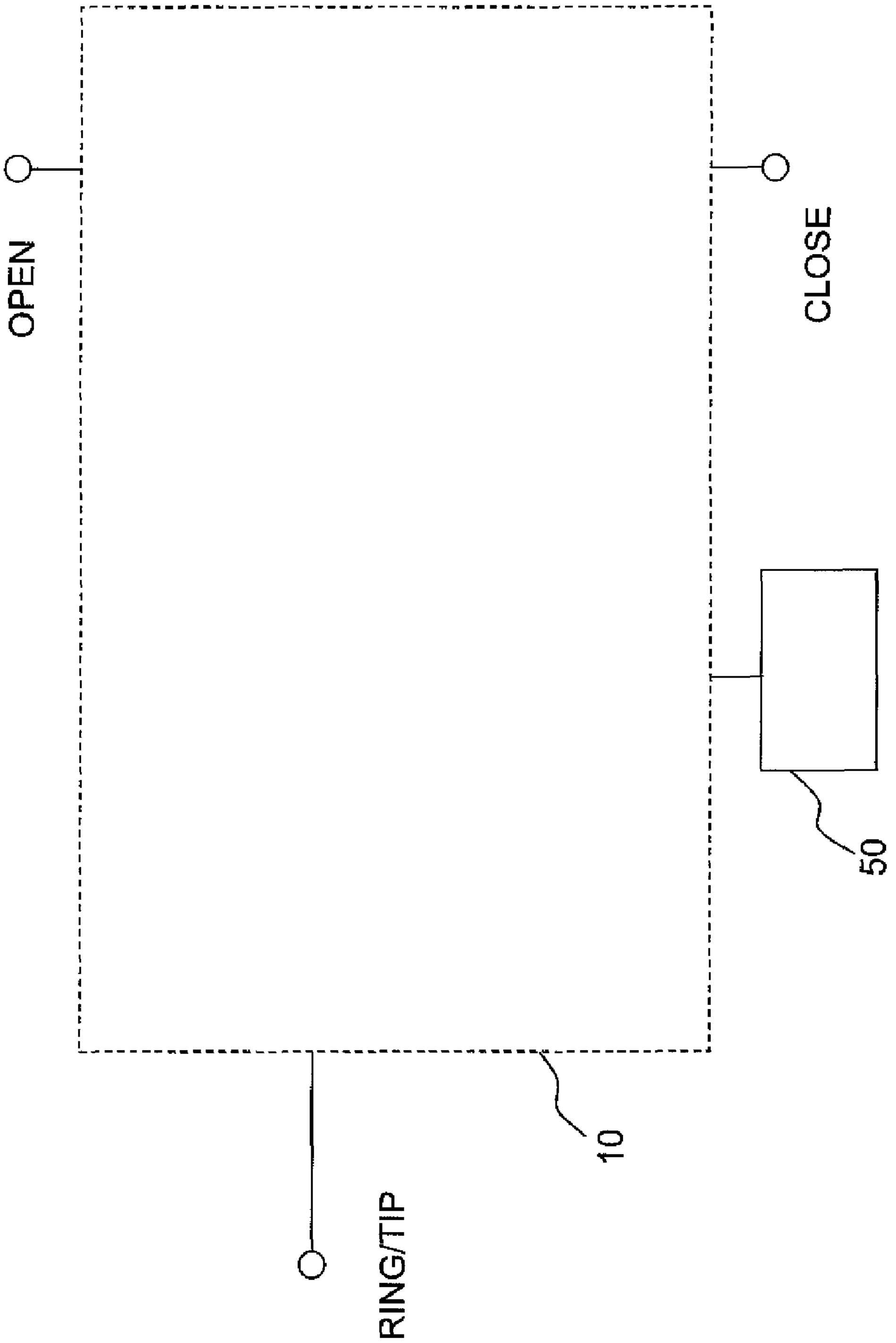
FIG. 5 is another schematic diagram showing a mobile calling unit of the mobile-controlled electric entrance device in accordance with the present invention.
Figure 6:
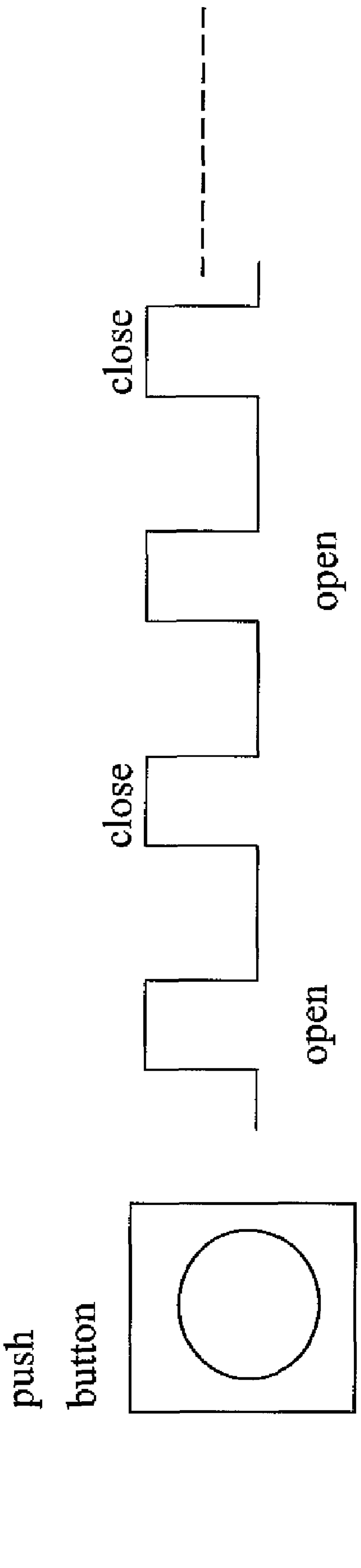
FIG. 6 PRIOR ART
FIG. 6 is a schematic diagram showing a conventional one-touch electric entrance device.
Figure 7:
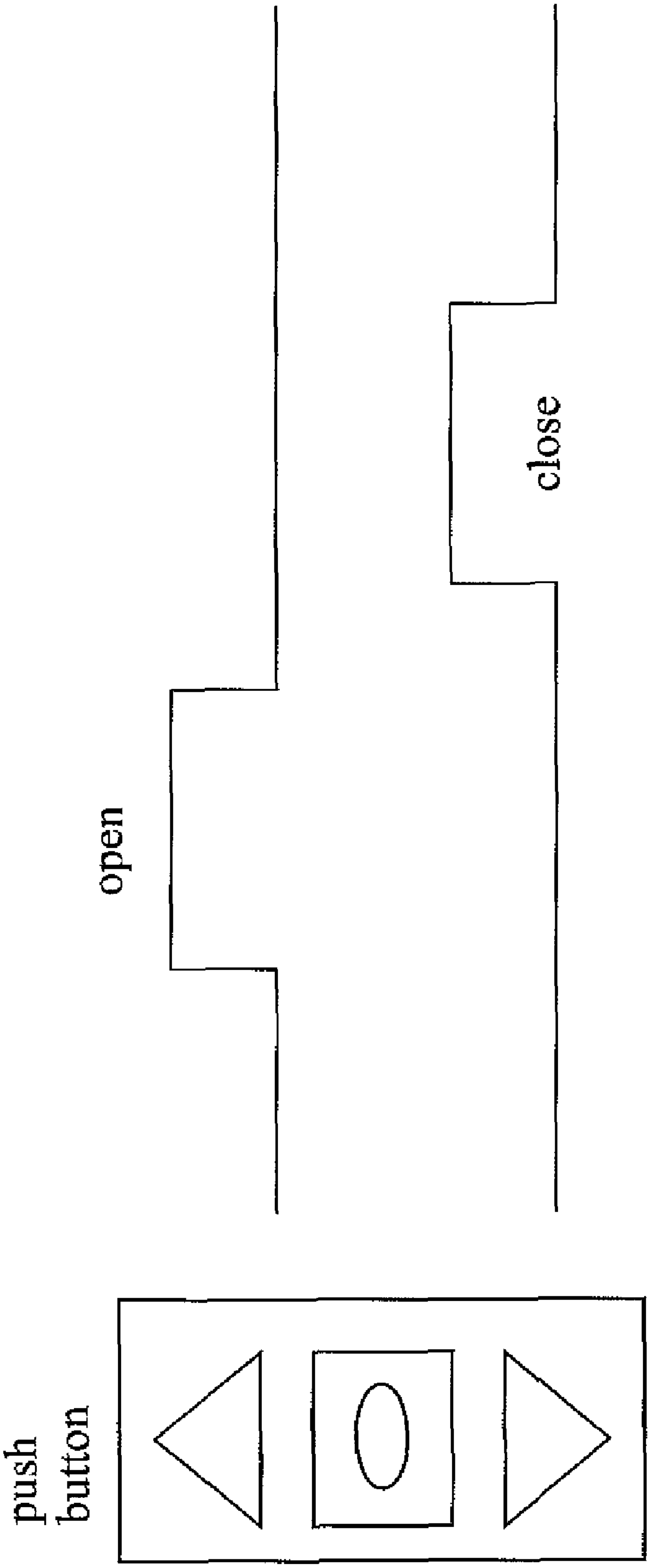
FIG. 7 PRIOR ART
FIG. 7 is a schematic diagram showing a conventional two-button electric entrance device.
Figure 8:
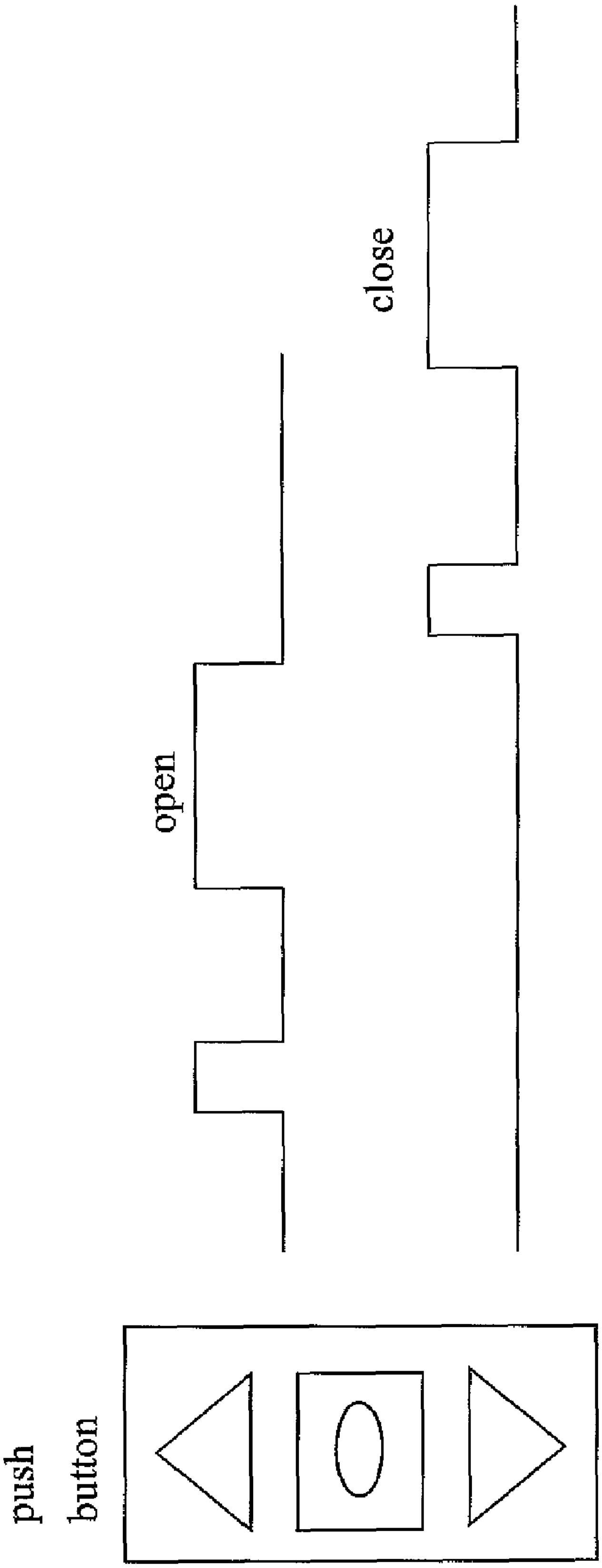
FIG. 8 PRIOR ART
FIG. 8 is a schematic diagram showing a conventional two-button electric entrance device with an awakening function.

In addition, as shown in FIG. 5, when a car is parked at a parking tower or stacked-style parking place, the conventional method for the car owner to get the car is to arrive there and push the mobile-controlled switch. Therefore, the user often spends several minutes or more than ten minutes to find the car depending upon where the user parks the car in the parking tower. It is time consuming. However, the present invention can save a lot of time and can guarantee safety and convenience.

By utilizing the invention, the following advantages are obtained. First, the present invention is able to compare and confirm the 8-11 digit phone numbers as the password before the mobile phone is connected (pick-up). The present invention can reset the output to prevent error operation when comparing the phone number. Therefore, the cost of excessive communication fees is reduced, and convenience is greatly enhanced. Thus, the present invention can effectively guarantee safety.

Second, in the present invention, the oscillation timer 13 further generates a sequential pulse itself, and the delay and sequential logical decoding unit 14 decides to open or close the electrically powered entrance body according to a ringing time (not the number of ring pluses) of a mobile controller. For example, a first short call can open the electrically powered entrance body, and a next second short call can close the electrically powered entrance body, or a first short call can open the electrically powered entrance body, and a next second long call can close the electrically powered entrance body. Thus, there are no complex instructions in the present invention. The present invention can save a lot of communication expense and can be adapted to many common locks or electric doors.

Although the invention has been explained in relation to its preferred embodiment, it is to be understood that many other possible modifications and variations can be made without departing from the spirit and scope of the invention as hereinafter claimed.

The invention claimed is:

1. A mobile-controlled electric entrance device comprising:

an electrically powered entrance body;

a control unit including a mobile phone number comparison unit, a storage unit, an oscillation timer, a delay and sequential logical decoding unit, a current driver, and a relay switch; and a door-opened feed back unit automatically activating a monitor signal to provide feedback whether the electrically powered entrance body is opened or closed;

wherein the control unit is adapted to be controlled by a mobile phone wirelessly;

wherein the storage unit stores a plurality of predetermined phone numbers, wherein the control unit is further electrically connected to the door-opened feedback unit;

wherein the mobile phone number comparison unit receives a call from the mobile phone and demodulates the call to compare a phone number of the call with the plurality of predetermined phone numbers to generate a comparison result;

wherein an output operation is blocked by the delay and sequential logical decoding unit to prevent error operation;

wherein the oscillation timer generates first and second sequential pulses having different time widths and is electrically connected to the delay and sequential logical decoding unit to provide a necessary internal timing;

wherein if the phone number is not found in the plurality of predetermined phone numbers based on the comparison result, the mobile phone number comparison unit returns to a stand-by state;

wherein if the phone number is found in the plurality of predetermined phone numbers based on the comparison result, the mobile phone number comparison unit transmits a signal to trigger the oscillation timer to generate one of the first and second sequential pulses; and wherein the delay and sequential logical decoding unit is controlled to operate the current driver and the relay switch according to the one of the first and second sequential pulses generated by the oscillation timer for opening or closing the electrically powered entrance body.

2. The device of claim 1, wherein the control unit is further in parallel connection with a communication device.

3. The device of claim 2, wherein the communication device is a telephone.

4. The device of claim 2, wherein the communication device is a facsimile.

5. The device of claim 2, wherein the communication device is a modem.

6. The device of claim 1, wherein the door-opened feedback unit is a reed switch alarm.

7. The device of claim 1, wherein the control unit is further electrically connected to an alarm termination unit; the alarm termination unit is connected to a security unit; and when the electrically powered entrance body is opened, the alarm termination unit turns off an alarm from the security unit at the same time.

8. The device of claim 1, wherein the control unit is further electrically connected to a mobile calling unit.

9. The device of claim 1, wherein the electrically powered entrance body is a cathode lock-style door.

10. The device of claim 1, wherein the electrically powered entrance body is an anode lock-style door.

11. The device of claim 1, wherein the electrically powered entrance body is an electronic lock-style door.

12. The device of claim 1, wherein the electrically powered entrance body is a roller door.

13. The device of claim 1, wherein the electrically powered entrance body is a roller window.

14. The device of claim 1, wherein the electrically powered entrance body is a fence-style door in a driveway.

15. The device of claim 1, wherein the electrically powered entrance body is an entrance of a parking tower.

16. The device of claim 1, wherein the delay and sequential logical decoding unit is a logical circuit.

* * * * *